United States Patent
Cornelius

(10) Patent No.: US 7,437,586 B2
(45) Date of Patent: *Oct. 14, 2008

(54) METHOD AND APPARATUS FOR MANAGING A POWER LOAD CHANGE IN A SYSTEM

(75) Inventor: William P. Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/274,691

(22) Filed: Nov. 14, 2005

(65) Prior Publication Data

US 2006/0123256 A1 Jun. 8, 2006

Related U.S. Application Data

(63) Continuation of application No. 10/053,766, filed on Jan. 18, 2002, now Pat. No. 6,978,388.

(51) Int. Cl.
*G06F 1/30* (2006.01)

(52) U.S. Cl. .................. 713/340; 713/300; 327/544

(58) Field of Classification Search .............. 713/340; 713/300; 327/540

See application file for complete search history.

(56) References Cited

U.S. PATENT DOCUMENTS

| | | | | |
|---|---|---|---|---|
| 4,428,016 A * | 1/1984 | Brasfield | ............... | 316/18 |
| 5,021,679 A * | 6/1991 | Fairbanks et al. | ........... | 713/321 |
| 5,623,197 A * | 4/1997 | Roseman et al. | ........... | 320/134 |
| 5,623,647 A * | 4/1997 | Maitra | ........... | 713/501 |
| 5,774,736 A * | 6/1998 | Wright et al. | ........... | 713/330 |
| 5,955,871 A * | 9/1999 | Nguyen | ........... | 323/282 |
| 6,141,762 A * | 10/2000 | Nicol et al. | ........... | 713/300 |
| 6,327,663 B2 * | 12/2001 | Isaac et al. | ........... | 713/300 |
| 6,580,597 B2 * | 6/2003 | Kanouda et al. | ........... | 713/322 |
| 6,661,263 B2 * | 12/2003 | Rose et al. | ........... | 327/134 |
| 2002/0046354 A1 * | 4/2002 | Ostrom et al. | ........... | 713/300 |
| 2004/0107370 A1 * | 6/2004 | Mosley | ........... | 713/300 |

OTHER PUBLICATIONS

Ostrom et al, Apparatus and System for Providing Transient Suppression Power Regulation, Aug. 31, 2001, USPGPub.*
Mosley, Method and Apparatus for Supplying Power to Electronic Circuits, Dec. 3, 2002, USPGPub.*

* cited by examiner

*Primary Examiner*—Thuan N Du
(74) *Attorney, Agent, or Firm*—Blakely, Sokoloff, Taylor & Zafman LLP

(57) ABSTRACT

An apparatus and method for maintaining a state during a power load change. The apparatus of one embodiment includes a voltage controller coupled to receive a signal from a detector of current change. The detector of current change in this embodiment is coupled to detect change in the current level at a microprocessor and signal a voltage controller of such change, which in turn causes a change in the voltage supplied to the microprocessor. An embodiment of the method comprises using a current detector in detecting current change in a microprocessor, determining according to the current change the power level that is needed to be maintained and increasing the voltage level for a predetermined amount of time to compensate for (any) voltage droop. In an alternative embodiment, a change in power is determined before the change occurs and as such determines the power level needed at the microprocessor.

26 Claims, 12 Drawing Sheets

Flow Chart

METHOD AND APPARATUS FOR MANAGING A POWER LOAD CHANGE IN A SYSTEM

This application is a continuation application of U.S. patent application Ser. No. 10/053,766, filed Jan. 18, 2002, now U.S. Pat. No. 6,978,388.

FIELD OF THE INVENTION

The present invention relates to devices for managing voltage levels to computer electronic devices and, in turn, maintains a desired level of performance.

BACKGROUND OF THE INVENTION

Voltage regulators are widely used in hardware designs to maintain a steady supply of voltage via a power distribution bus to the various components of an exemplary computer system.

The use of a voltage regulator in the prior art to provide a consistent voltage level at the microprocessor of a computer system is well known. FIG. 1 shows a typical voltage regulator as it is used in the prior art in a typical computer system; the voltage regulator(s) provide a consistent voltage level to one or more various components of a computer system via a power line or a power distribution bus. In many systems today, a computer's microprocessor may have its own, dedicated power regulator.

However, in certain situations the voltage regulator fails to maintain the necessary voltage level resulting in a droop in the power level at the microprocessor, which leads to a delay or failure in performance. One such situation occurs when the microprocessor is at a dormant (e.g. half asleep) state, at which time the microprocessor is called upon to perform a function, which requires a certain amount of power. In some instances the change in current consumption can be as much as 50 amps. This abrupt demand for power from the microprocessor results in a voltage droop in the output of the voltage regulator, which under normal circumstances remains constant. This voltage shortage results in a drop in power level at the microprocessor, which may cause the microprocessor to hang/crash (e.g. the voltage droop reduces the microprocessor's maximum operating frequency) for a period of time until voltage levels are eventually restored. The maximum operating frequency ("Fmax") of a microprocessor will drop as its supply voltage drops. If the microprocessor has an operating frequency of "Foper" and the supply voltage drops such that Foper>Fmax, then the system will hang/crash. FIG. 2 illustrates how the voltage droop occurs in the output of the voltage regulator when the microprocessor changes states (e.g. when a large clock domain in the microprocessor is turned on). Two mechanisms can cause short term voltage droop. One is due to inductance, and the other is due to resistance. Inductance voltage droop is described by the equation $V=L\,di/dt$ where the voltage drop across an inductance L is given by the derivative of the current through the inductance with respect to time. Resistive voltage droop is described by the equation $V=IR$, where I is the current and R is resistance; as I increases, the voltage droop increases.

FIG. 3 shows an example in the prior art of dealing with this problem of power supply droop. One or more levels of capacitors typically support the voltage on the microprocessor die: (a) capacitors on the die; (b) capacitors on the package for the die (around the perimeter of the die); and (c) capacitors on the printed circuit board immediately opposite the microprocessor package. When the voltage droop occurs as in the situation described above, the capacitors discharge, sourcing current, and power is passed to the microprocessor to compensate for the shortage in power due to increased power loading of the microprocessor. However, this technique has significant disadvantages; the capacitance at (a) has limited size as it is on the die and is very expensive, and capacitance at (b) and (c) is limited by the path impedance from the Core Vdd to the capacitors to Vss and back to the Vss of the Core. For an advanced microprocessor the path inductance needs to be less than 20 pH, and the path resistance needs to be less than 100 micro ohms. This gives a droop level of about an appreciable amount of millivolts due to practical limits. Decreasing the droop magnitude requires exponentially less power supply path inductance. This can be attempted with exotic capacitors and more expensive package/board methods, but they cannot eliminate the effect. The invention eliminates the effect at a cheaper cost point.

An example of an embodiment of the present invention is to resolve this problem of droop in the power supply, which can lead to a decrease in microprocessor maximum operating frequency.

SUMMARY OF THE INVENTION

Methods and apparatuses for maintaining power in a data processing system are disclosed. In order to maintain a certain level of power in a data processing system, one apparatus of the present invention, in an exemplary embodiment, detects power level change in the system by detecting a change in current or voltage. In this embodiment, once the power level change is detected, a signal is relayed to a component (e.g. a voltage controller) to boost voltage to a processor (e.g. a microprocessor) through a power distribution bus and as such compensate for a potential voltage droop. An embodiment of one method comprises using a current detector to ascertain changes in power by detecting change in current drawn by a microprocessor, and as such, determine whether to increase voltage to a certain level for a predetermined amount of time to compensate for any voltage droop and, in turn, maintain power in the data processing system.

In an alternative embodiment, change in power is detected by programming a processor (e.g. a microprocessor) to anticipate changes in compute load and as such determine the power level needed to maintain the processor's frequency by instructing, in one embodiment, a voltage controller to increase voltage to compensate for any voltage droop that may occur at the processor (e.g. microprocessor).

In another exemplary embodiment, power loading can be monitored to determine the computational load, and this information can be used to select operating states. The states would be characterized by voltage and operating frequency. For example, a given operating voltage would have a corresponding Fmax (e.g. a low voltage "Vlow" would correspond to a maximum operating frequency of "Fmaxlow," and a higher operating voltage "Vhigh" would have a higher maximum operating frequency of "Fmaxhigh"). When compute load is low (for example, during a time when the computer system is in an idle state), the microprocessor and/or other hardware is operated at a lower frequency than the "Fmaxlow" frequency (operating frequency<"Fmaxlow") and the voltage applied to the microprocessor and/or other hardware is set to "Vlow." When the computational load increases (e.g. a large, previously idle portion of the microprocessor starts to consume greater power than before), the system would move to a higher voltage state so that the system can then support (after the higher voltage state is established) a higher operating frequency. The operating frequency is changed to the higher operating frequency after the higher voltage state is established. Once the system reduces current consumption (e.g. a return to an idle state for the portion of the microprocessor), this reduction can be detected and the system's operating frequency can be reduced and then the supply voltage level is reduced.

DETAILED DESCRIPTION OF THE INVENTION

In the following description for purposes of explanation, specific systems, interconnections and signals are set forth in order to provide a thorough understanding of the present invention.

Figure 4:
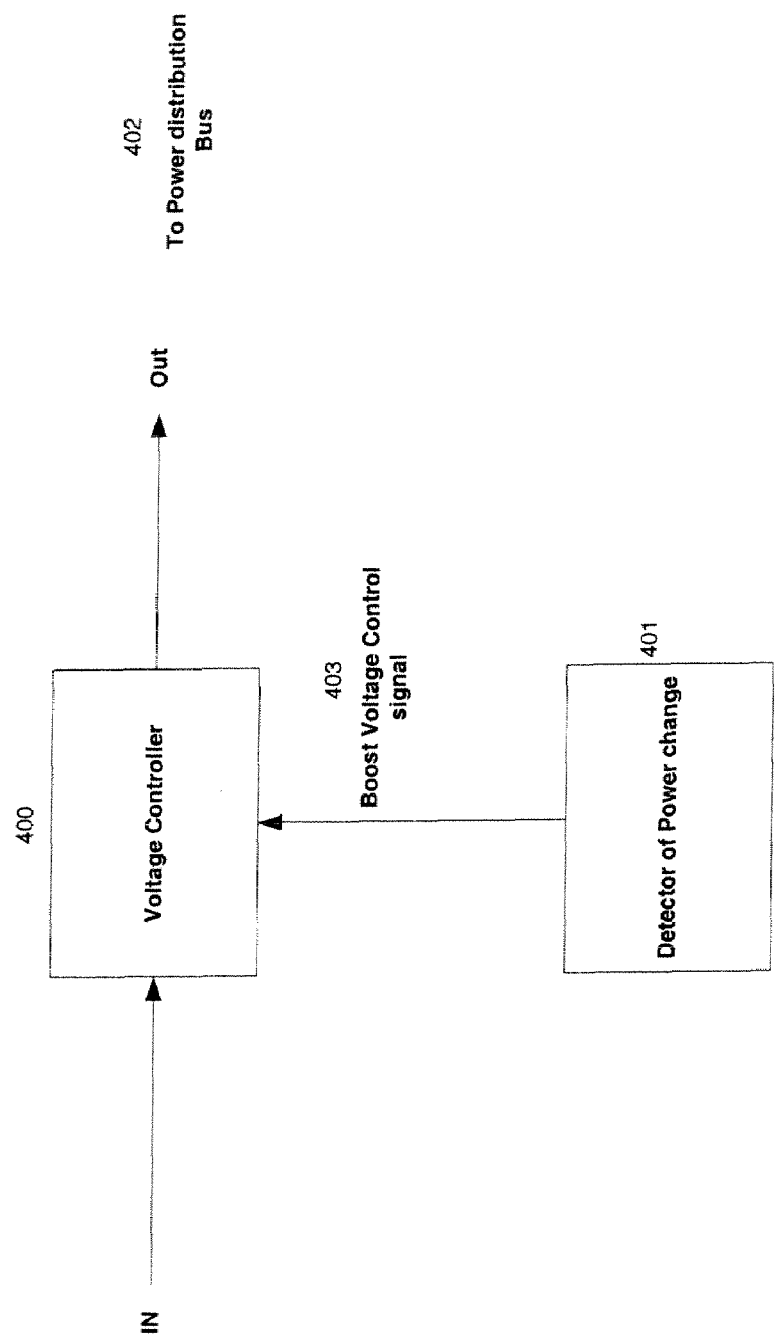
FIG. 4 shows an example of an embodiment according to the present invention.

FIG. 4 shows one embodiment of the present invention. The voltage controller 400 receives a power input from a power supply source, such as, for example, AC to DC rectifier circuit, and provides as an output a controlled voltage. This output is provided to power distribution planes (in the printed circuit board) which distribute the power to components in the system such as a processor (a microprocessor). These planes are referred to herein as a power distribution bus. It will be appreciated from the discussion herein that the voltage controller 400 does not function in the same manner as a conventional voltage regulator which merely attempts to maintain a constant voltage level regardless of power consumption. A voltage controller 400 is coupled to receive a signal to boost voltage 403 from a detector of power change 401. The voltage controller 400 is coupled with a power distribution bus 402 to provide power to, for example, a microprocessor in the system which is coupled to this bus. The detector of power change 401 detects a change in one of current or voltage and is coupled to send a signal to boost voltage 403 to the voltage controller 400, which is coupled to relay a voltage boost through a power distribution bus 402 (which is typically a plurality of conductive planes in a printed circuit board in one case). The detector of power change 401 detects a change in current drawn by a processor 100 (described below under FIG. 11) and is typically coupled to the processor. The current detector may, in one embodiment, measure current directly or may, in an alternative embodiment, sense magnetic flux or magnetic flux changes.

Figure 5:
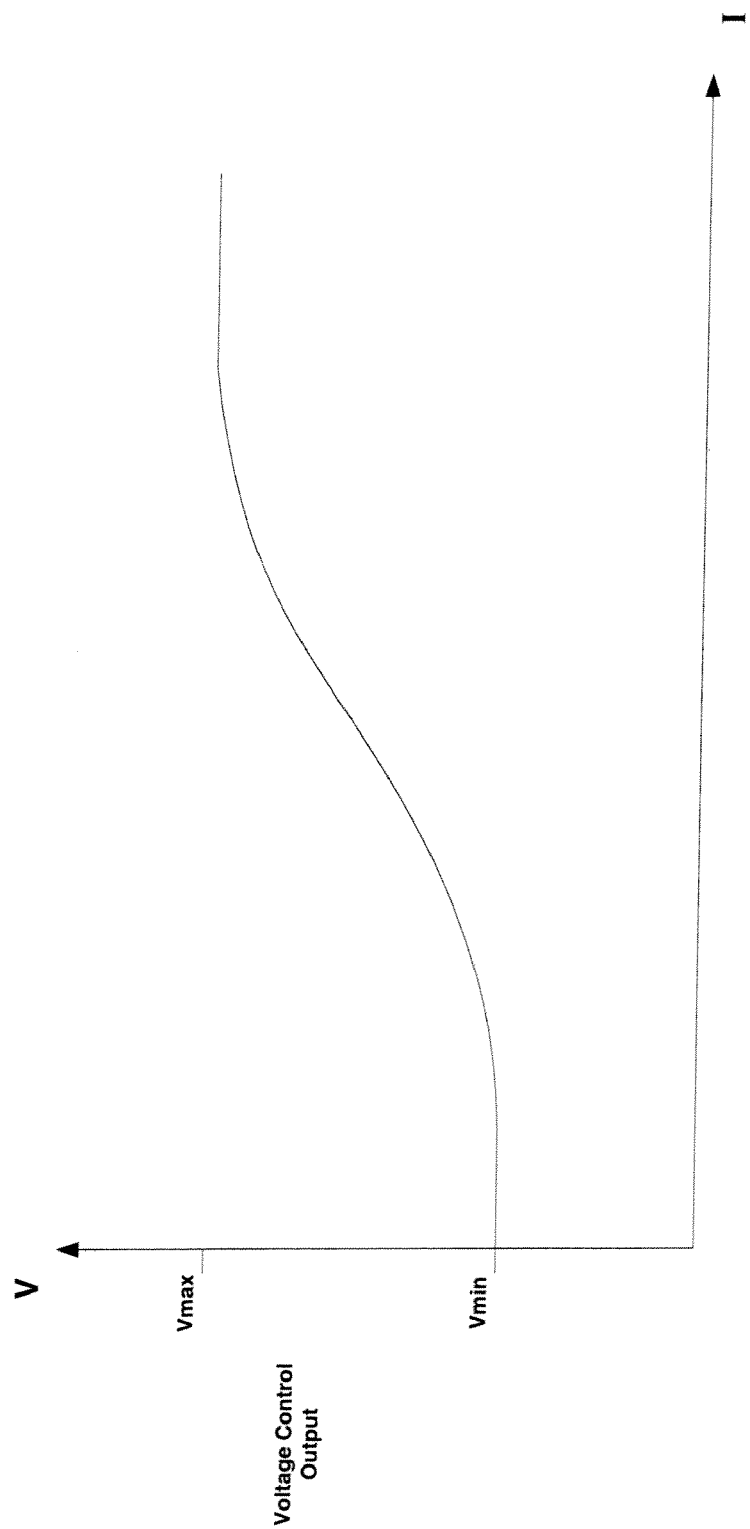
FIG. 5 shows a graph representing how an example of an embodiment according to the present invention increases the voltage to a certain limit in order to compensate for a voltage droop.

FIG. 5 shows a representation of an adjustable reference voltage, which voltage controller 400 provides, in one embodiment, in response to a signal which represents a current level. The curve of FIG. 5 shows a relationship between an output voltage level from voltage controller 400 and a current level, which is detected by the detector of power (e.g. current) change 401 and is represented in a signal 403. A voltage controller 400 may produce the behavior of the curve of FIG. 5, using a look up table (LUT) which maps, through the curve, an input current (I), along the horizontal "X" axis of FIG. 5, to an output voltage, along the vertical "Y" axis of FIG. 5, to be outputted by the voltage controller 400 in response to the input current. Of course, the values in the LUT may be obtained directly from the curve's abscissa and ordinate values in FIG. 5. An example of a method for generating the values of the curve is described herein (e.g. see FIGS. 10A and 10B). Thus, in one exemplary embodiment, a detector of power change, such as detector 401, senses a change in power load (e.g. an increase in current consumed by a microprocessor) and in turn causes a signal, such as a boost signal 403, to be sent to a voltage controller, such as controller 400 which in turn increases, at least momentarily, the output voltage. The increase in output voltage may be constrained to a maximum amount (e.g. as determined by the safe operating limits for an input voltage to an integrated circuit), such as Vmax as shown in FIG. 5, and the actual increased output voltage may, in one embodiment, be determined by the curve of FIG. 5, through a LUT as described above. Thus, in the case of a LUT implementation, signal 403 provides a value representing an I value on the X axis of FIG. 5 which maps, through the curve's values stored in the LUT, to an output voltage value on the "Y" axis. Alternatively, the actual increased output voltage may be a predetermined stepped increase (e.g. see FIG. 10A) or merely a single, predetermined increase (regardless of current consumption) which does not require any mapping. The increased output voltage is normally for a momentary period of time which usually coincides with the start up of a large portion of circuitry in an integrated circuit (IC).

Figure 6:
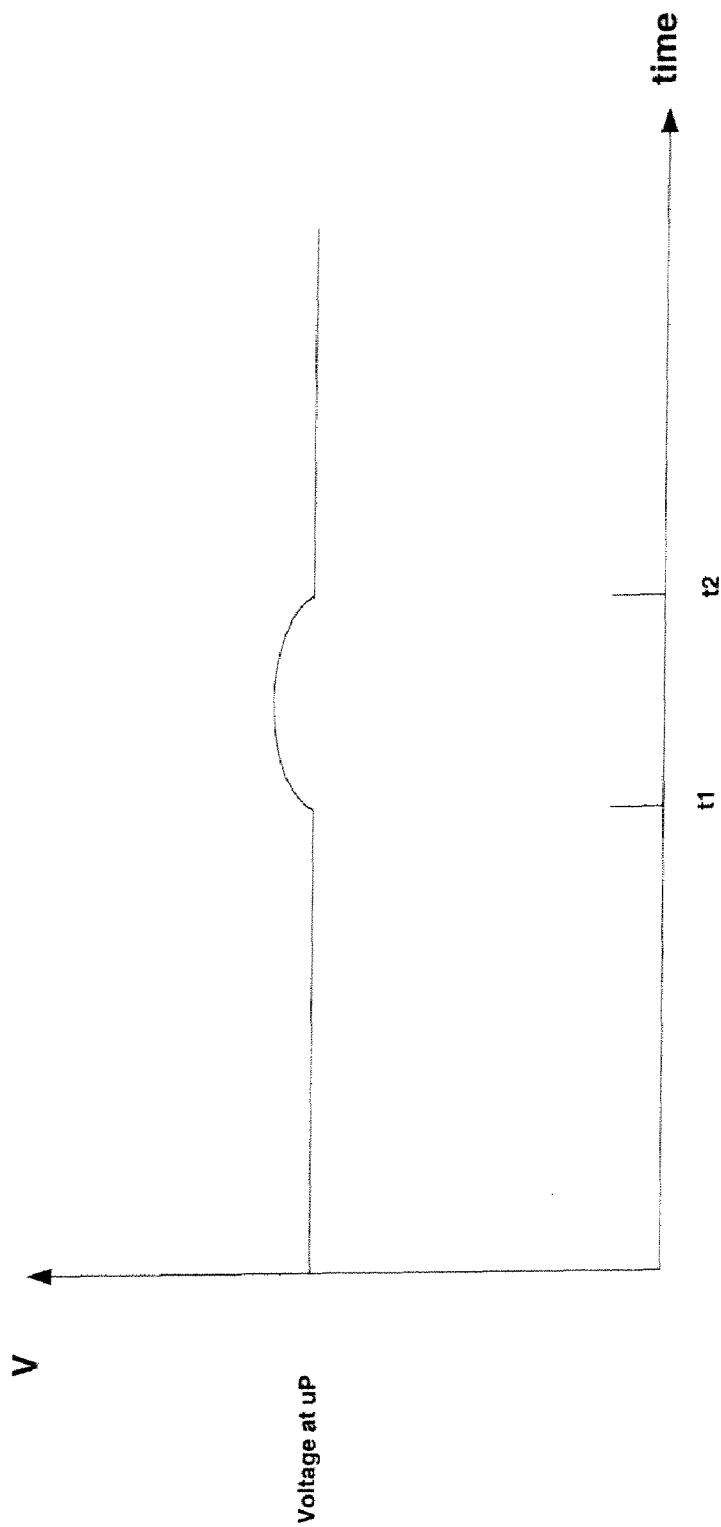
FIG. 6 shows how the increase in voltage represented in FIG. 5 is maintained for a limited amount of time.

FIG. 6 shows a representation, in one embodiment, of how the voltage controller 400, when it receives a boost voltage control signal 403, increases voltage, through the power distribution bus 402, at for example a microprocessor (as described below under FIG. 11) for a limited time (represented as t1-t2). The curve of FIG. 6 illustrates the output voltage from an embodiment of a voltage controller of the invention, such as voltage controller 400. As shown in FIG. 6, at times before t1 and at times after t2, the output voltage at a system's microprocessor is at a constant value and thus the voltage controller is acting in a manner which resembles a voltage regulator. At time t1 a change in power consumption (e.g. an increase in current drawn by the microprocessor) is detected, causing the voltage controller to increase its output voltage, which is supplied to the power distribution bus, from the period of time between t1 and t2. The actual amount of the output voltage increase (between t1 and t2) may be a fixed, predetermined amount (which is the same regardless of the change in current drawn by the microprocessor or other circuitry) or it may depend upon the amount of current or power being consumed (e.g. it may depend in a manner reflected by the curve of FIG. 5 such that the output voltage increase may be X when I=A and the output voltage increase may be Y when I=B, where X>Y when A>B (assuming that the output voltage is constrained within Vmin and Vmax as shown in FIG. 5)).

Figure 11:
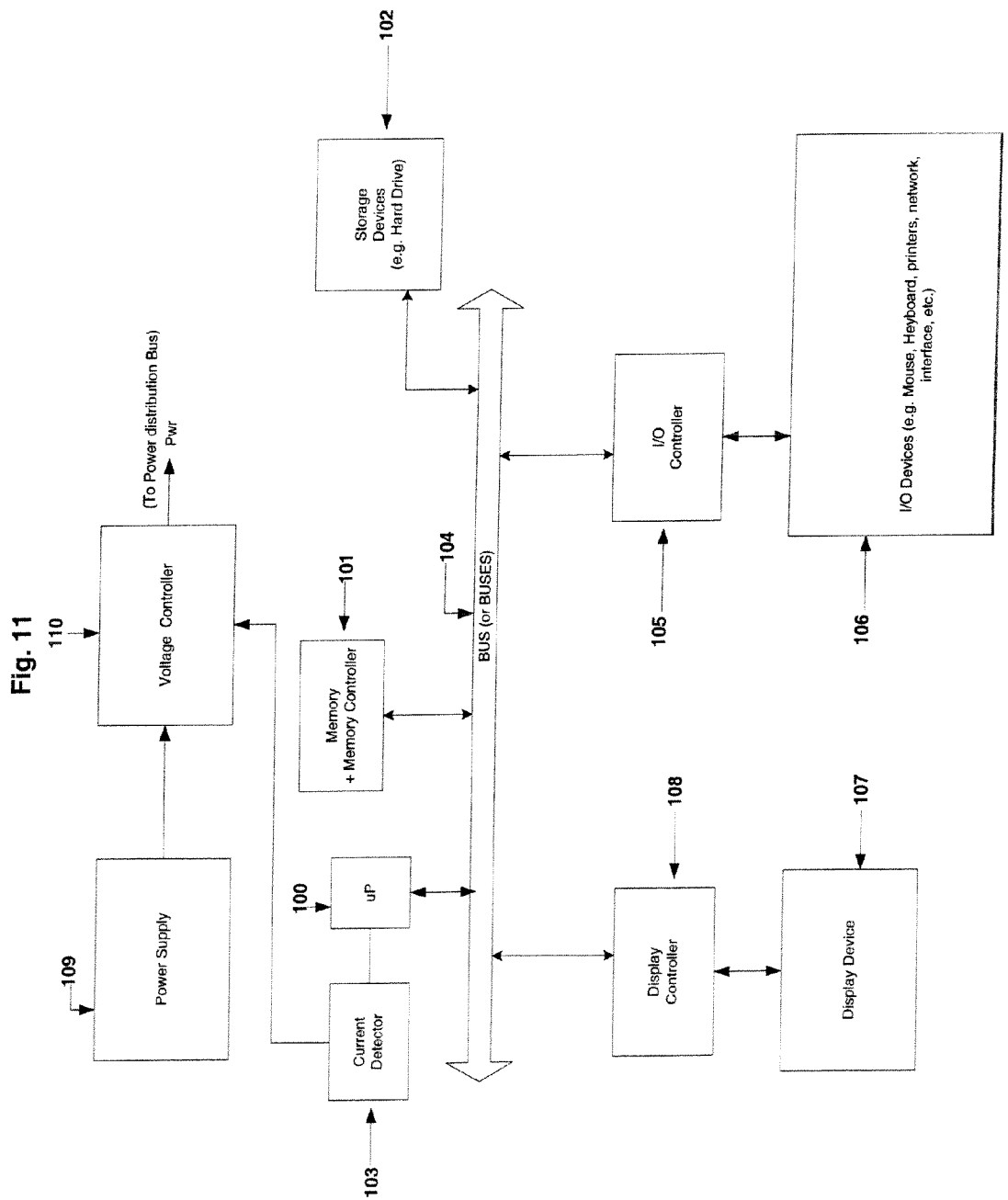
FIG. 11 shows an example of an embodiment of the present invention and how it relates to an exemplary computer system.

FIG. 11 shows a typical computer system, which may incorporate the apparatus of the present invention. The computer may include a processor 100, which is typically a microprocessor. The microprocessor is coupled to various computer components through a BUS (or BUSES) 104. Similarly, input and output devices 106, such as keyboards, hard disks, and other well-known computer devices are coupled through one or more input/output controllers 105 which are coupled through a BUS (or BUSES) 104 to other computer system components such as the Memory 101 and Storage devices 102. The Memory and Memory controller 101 as well as Storage Devices (e.g. Hard Drive) 102 are coupled to the computer system components through a BUS (or BUSES) 104. Other components of a typical computer system are also represented in FIG. 11 such as Display Devices 107, which are coupled through one or more Display controllers 108 that are coupled to other computer system components through a BUS (or BUSES) 104.

Figure 1:
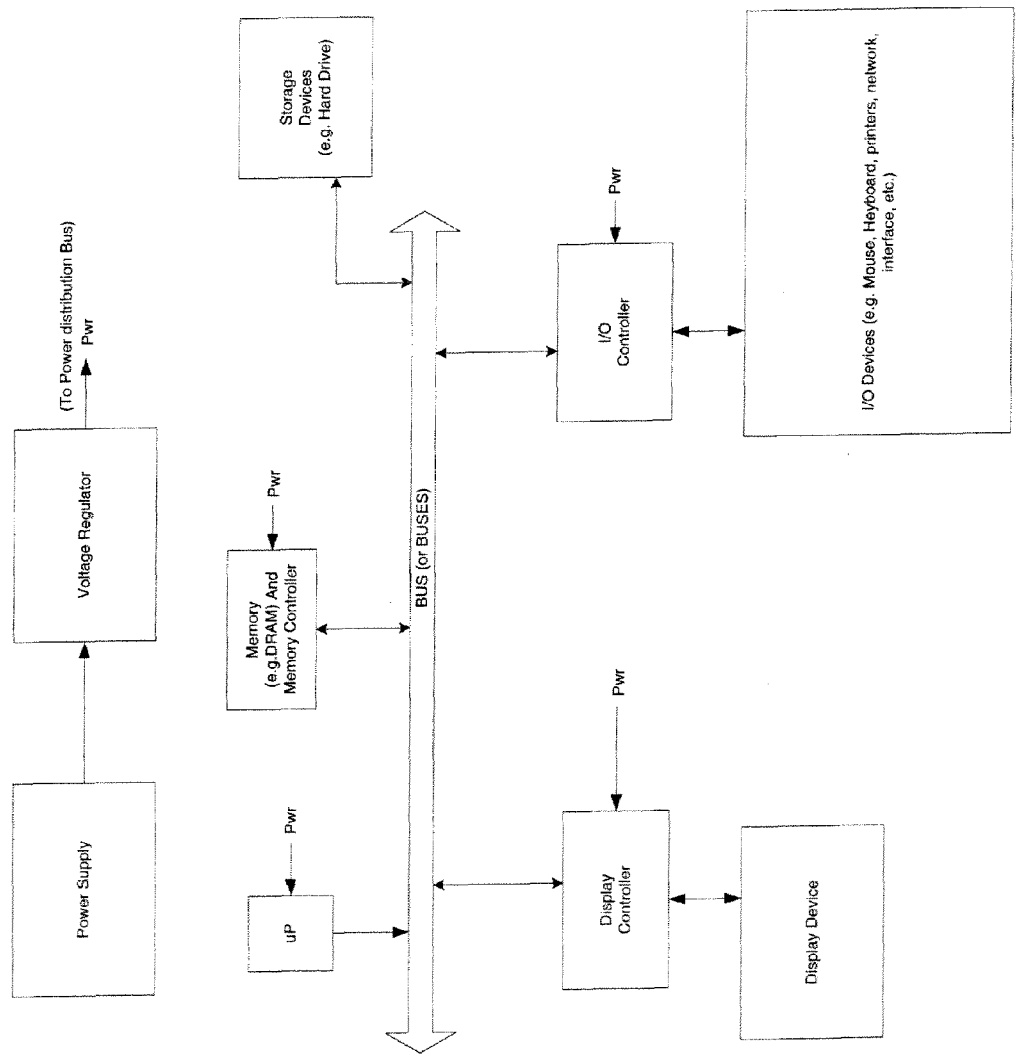
FIG. 1 shows a typical prior art voltage regulator as it relates to a computer system.
Figure 2:
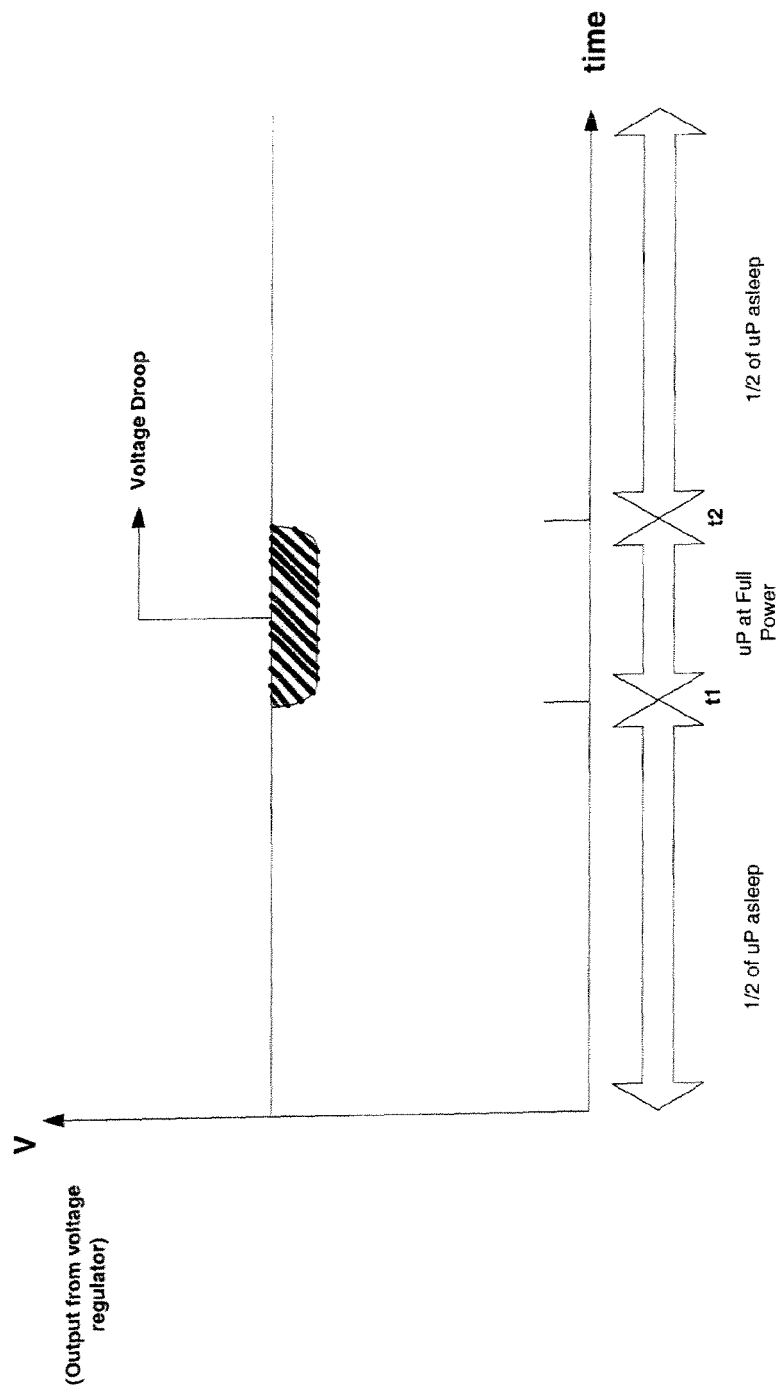
FIG. 2 shows how the prior art (e.g. the voltage regulator) is unsuccessful in preventing the occurrence of voltage droops.
Figure 3:
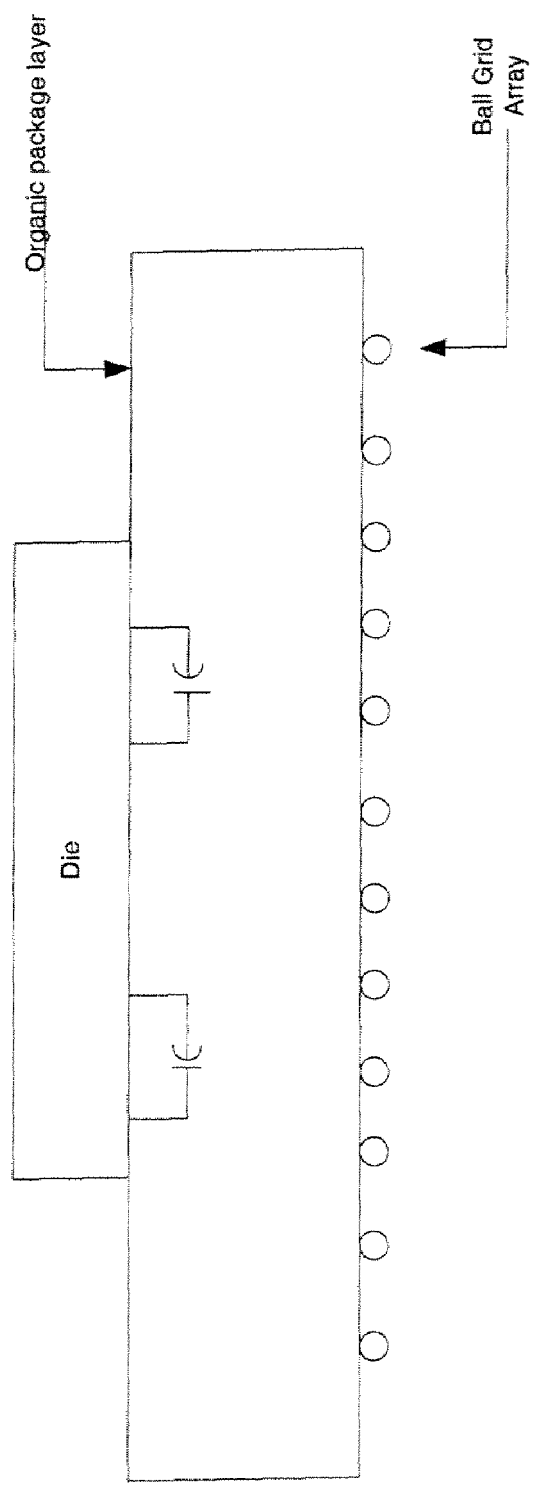
FIG. 3 shows another typical prior art approach, in which, capacitors are coupled with the microprocessor's Die in order to deal with voltage droop.
Figure 10:
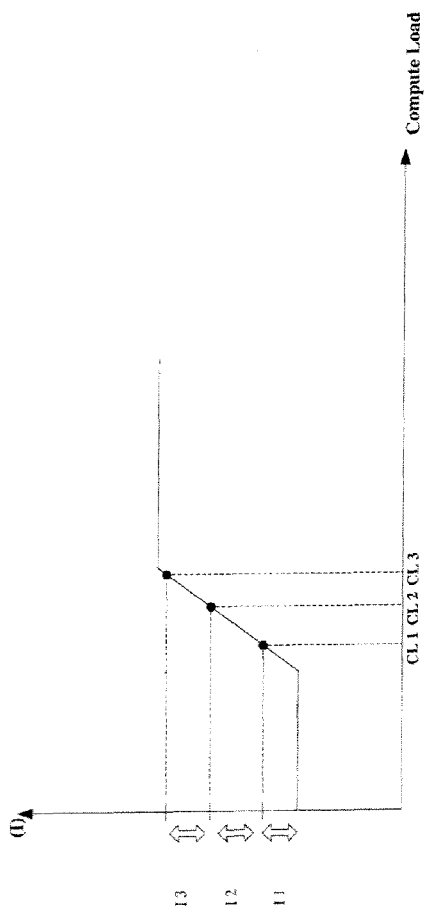
FIG. 10A shows an example of how one embodiment of the invention takes advantage of the relationship between current and compute load in order to manage the voltage level during power (watts) load changes.
FIG. 10B shows a graph representing how the current relates to the voltage needed to maintain a certain power level.
Figure 10:
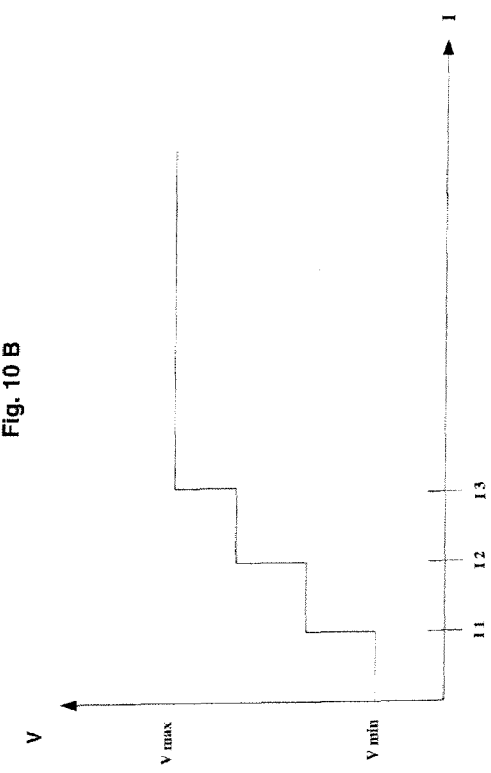

FIG. 11 also shows a particular embodiment of the current invention as it is incorporated in a typical computer system. The apparatus includes a Current Detector 103 and a Voltage Controller 110. The Current Detector is coupled to detect current change in the Microprocessor 100, which is indicative of power change in the Microprocessor. The change in current is also indicative of the compute load level of the microprocessor as represented in FIG. 10A, and as the compute load increases, the current drawn increases resulting in a short term voltage droop. The voltage droop may occur due to the sudden demand for power that is the result, for example, of the change in the microprocessor state from half asleep to full power (e.g. turning on a large clock domain), as described in FIG. 2. An uncompensated power supply droop limits the maximum operating frequency (Fmax) of the microprocessor 100. In many systems, the microprocessor has its own dedicated voltage controller which may provide several controlled voltages to the microprocessor (e.g. 1.2 v, 3.3 v, etc.).

The Current Detector 103, which receives its power from power supply 109, is coupled to send a signal to the Voltage Controller 110. Once the Current Detector 103 detects change in the current at the microprocessor 100, it signals the Voltage Controller 110 to boost the voltage for a limited amount of time as represented in FIG. 6. The Voltage Controller 110 relays the voltage boost to the microprocessor through the power distribution bus (e.g. the microprocessor's voltage planes). This boost in voltage serves to compensate for any voltage droop that may occur due to the sudden demand for power at the microprocessor and as such enable the microprocessor to handle its compute load without experiencing a lower maximum operating frequency.

Figure 9:
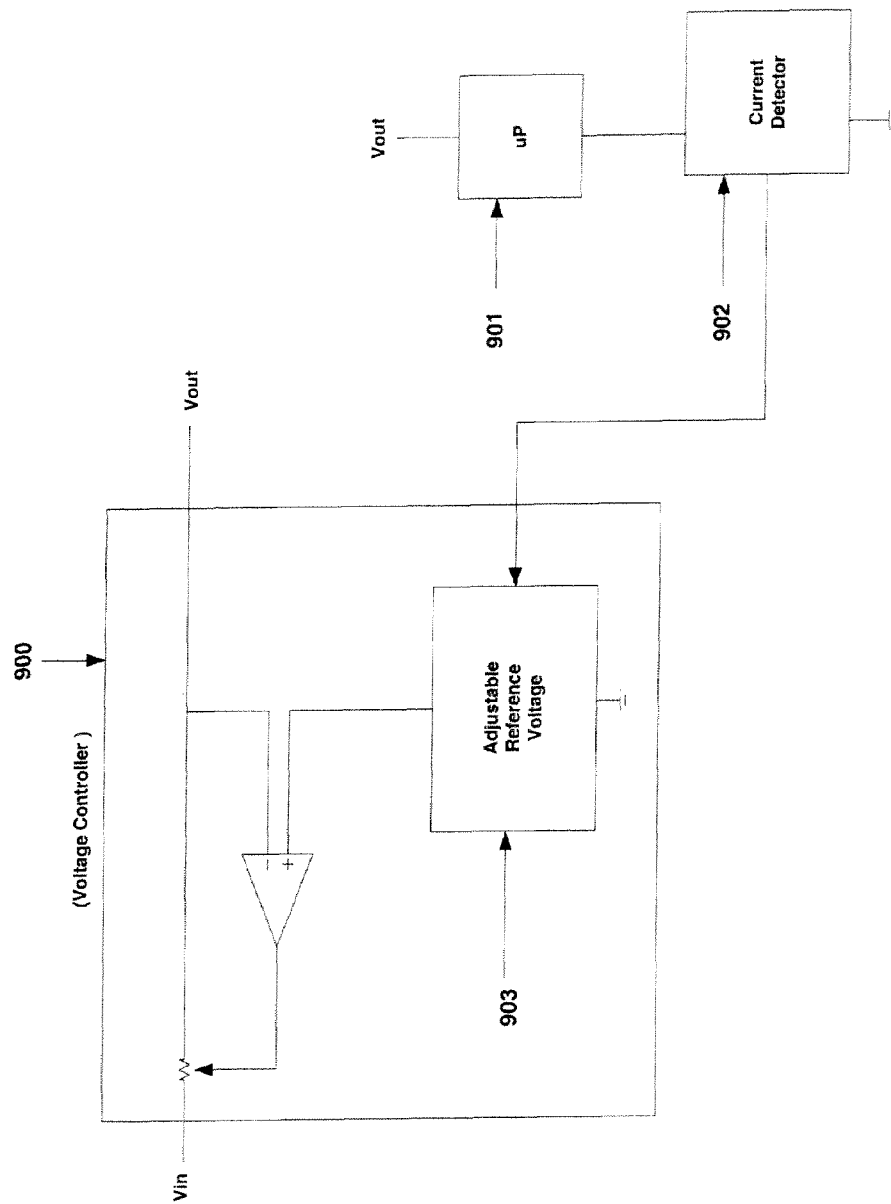
FIG. 9 shows a more detailed example of an embodiment according to the present function.

FIG. 9 shows a more detailed representation of a voltage controller of the invention such as the Voltage Controller 110. The Current Detector 902 in FIG. 9 that is coupled to the microprocessor 901 is also coupled to send a signal to an Adjustable Reference Voltage device 903. The Adjustable Reference Voltage 903 functions as a translator, which translates current levels to reference voltage levels. Once the Current Detector 902 detects the current level at the microprocessor it relays that information to the Adjustable Reference Voltage 903. In turn, the Adjustable Reference Voltage 903 determines the appropriate voltage level that must be provided by the Voltage Controller 900 according to the current level detected and as such the Voltage Controller boosts the voltage to the appropriate level through the differential amplifier of FIG. 9. The current to voltage relationship, of one embodiment, is exemplified in FIG. 5. It will be appreciated that the variable resistor, shown coupled to the output of the differential amplifier, may be implemented as multiple variable controlled resistors in parallel. An alternative of the controller of FIG. 9 may use a switched capacitor to switch in an additional voltage source for a period of time. In this alternative, Vin may be an auxiliary voltage on an auxiliary capacitor. When it is desired to add a voltage boost (Vboost) to mitigate voltage droop effects, the capacitor is switched into the output of the controller, and the charge on the capacitor would quickly move the Vout node, raising the voltage. The amount of the boost would be set by the ratio of the capacitance on Vout, the capacitor and the voltage difference prior to coupling/switching the capacitor onto Vout.

An exemplary method of the present invention will now be described by referring to FIG. 7. The method begins in 711. In 711, the current detector detects current change to determine whether power demand is increasing or is about to increase. In 712 if no current change is detected the process restarts. However, in 713, if current change is detected (e.g. the current increases rapidly beyond a threshold amount over a given period of time) then voltage through the voltage controller is increased for a limited time and up to a predetermined value. In 714, the voltage level is brought back to its normal level. An example of the behavior of the voltage level over time as a result of operation 713 is shown in FIG. 6.

Figure 7:
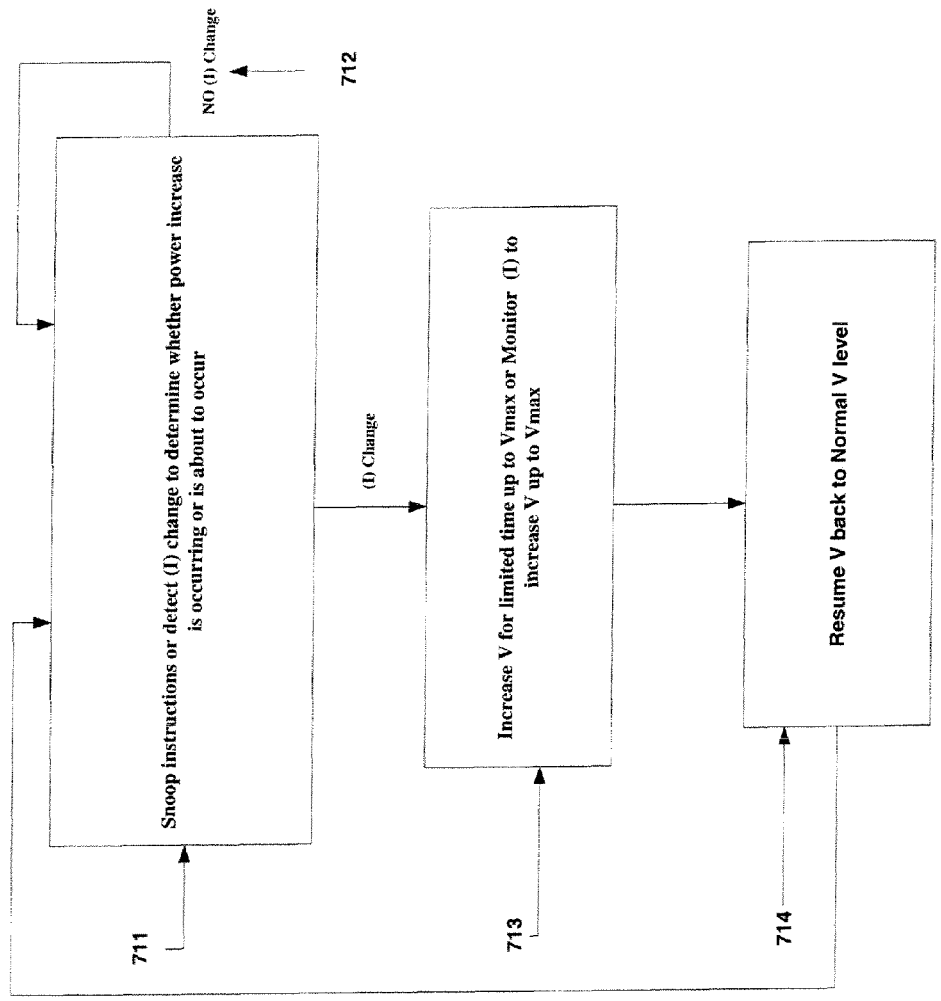
FIG. 7 shows a flow chart showing an exemplary method according to the present invention.

FIG. 7 also shows an alternative method of the present invention, which utilizes programming instructions (e.g. snoop instruction) to program the microprocessor to anticipate power supply droop. In one embodiment of this method, the microprocessor is programmed to anticipate changes in current by examining instructions that are queued to be executed at the microprocessor and thus anticipate whether power demand is going to increase (e.g. if a co-processor which is asleep is about to be awakened because queued instructions will require the use of the co-processor). In 712 if no current change is detected the process restarts. However, in 713, if current change is detected then voltage through the voltage controller is increased for a limited time and up to a predetermined value. In 714, the voltage level is brought back to its normal level.

In another exemplary embodiment, power loading can be monitored to determine the computational load, and this information can be used to select operating states. The states would be characterized by voltage and operating frequency. For example, a given operating voltage would have a corresponding Fmax (e.g. a low voltage "Vlow" would correspond to a maximum operating frequency of "Fmaxlow," and a higher operating voltage "Vhigh" would have a higher maximum operating frequency of "Fmaxhigh"). When compute load is low (for example, during a time when the computer system is in an idle state), the microprocessor and/or other hardware is operated at a lower frequency than the "Fmaxlow" frequency (operating frequency<"Fmaxlow") and the voltage applied to the microprocessor and/or other hardware is set to "Vlow." When the computational load increases (e.g. a large, previously idle portion of the microprocessor starts to consume greater power than before), the system would move to a higher voltage state so that the system can then support (after the higher voltage state is established) a higher operating frequency. The operating frequency is changed to the higher operating frequency after the higher voltage state is established. Once the system reduces current consumption (e.g. a return to an idle state for the portion of the microprocessor), this reduction can be detected and the system's operating frequency can be reduced and then the supply voltage level is reduced.

Figure 12:
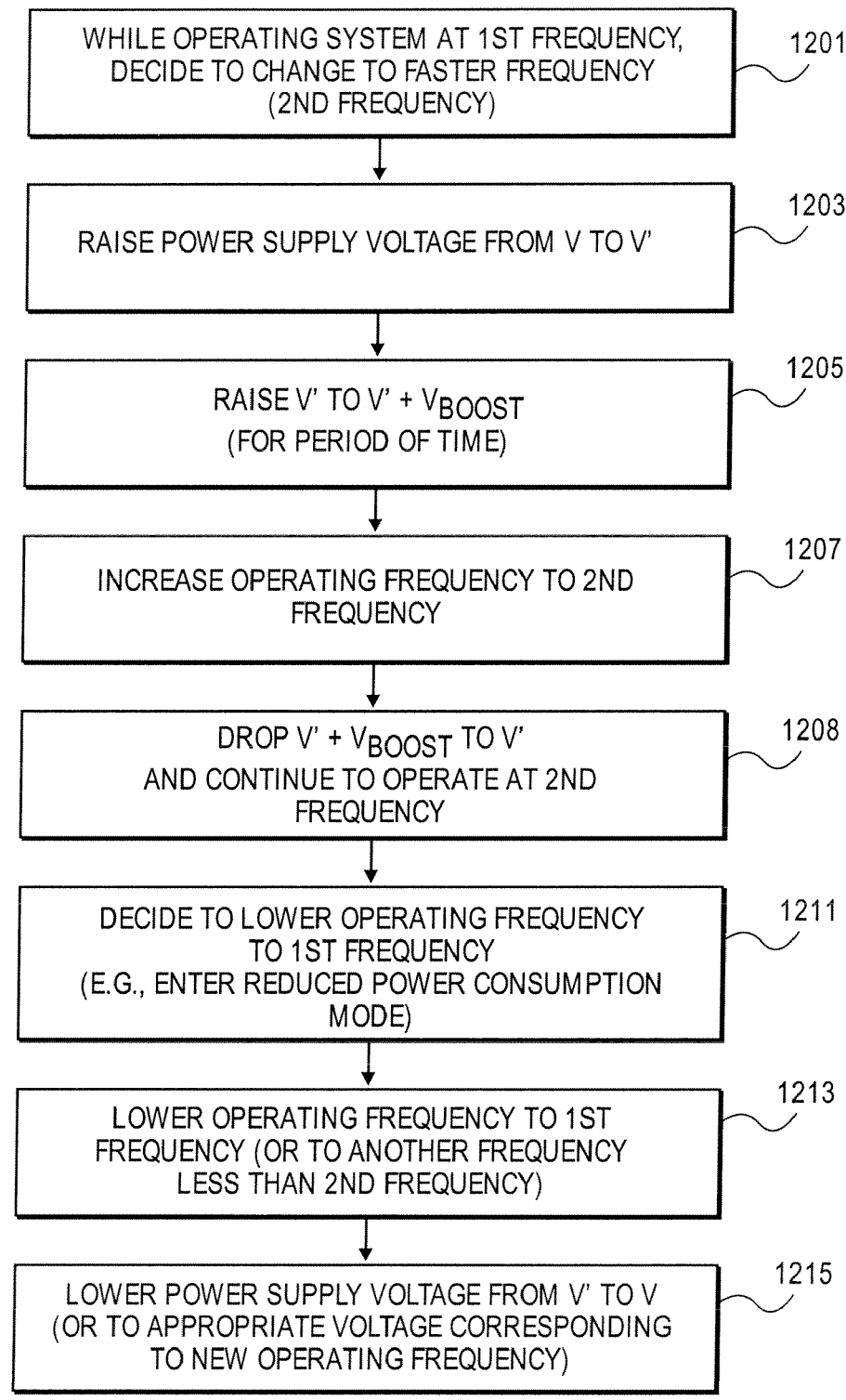
FIG. 12 shows another example of a method of the present invention.

The change from a low power supply voltage to a higher supply voltage may include the additional boost voltage (for a period of time) to mitigate the voltage droop effect. An example of this embodiment, with changes to states in the system, will now be provided while referring to FIG. 12. While operating a processing system (e.g. a microprocessor) at a first frequency, a determination is made in operation 1201 of FIG. 12, to change to a faster frequency (a "second" frequency). Prior to changing the operating frequency, the power supply voltage is raised in operation 1203 (from V to V'). An optional operation (1205) may then follow in which V' is increased to V'+Vboost for a period of time; this is similar to operation 713 of FIG. 7. This additional voltage boost is designed to mitigate the effects of voltage droop. Following operation 1205, the operating frequency is increased to a second frequency in operation 1207. Then, in operation 1209, the power supply voltage is reduced back to V' and the system continues to operate at the second operating frequency. In operation 1211, a determination is made to reduce the operating frequency (e.g. the system automatically decides to enter a reduced power consumption state or the user selects such a state). As a result, in operation 1213, the operating frequency of the system is lowered to the first frequency (or to another frequency which is lower than the second frequency). After operation 1215, the power supply voltage is lowered from V' to V (or to a voltage appropriate to the corresponding new operating frequency).

Figure 8:
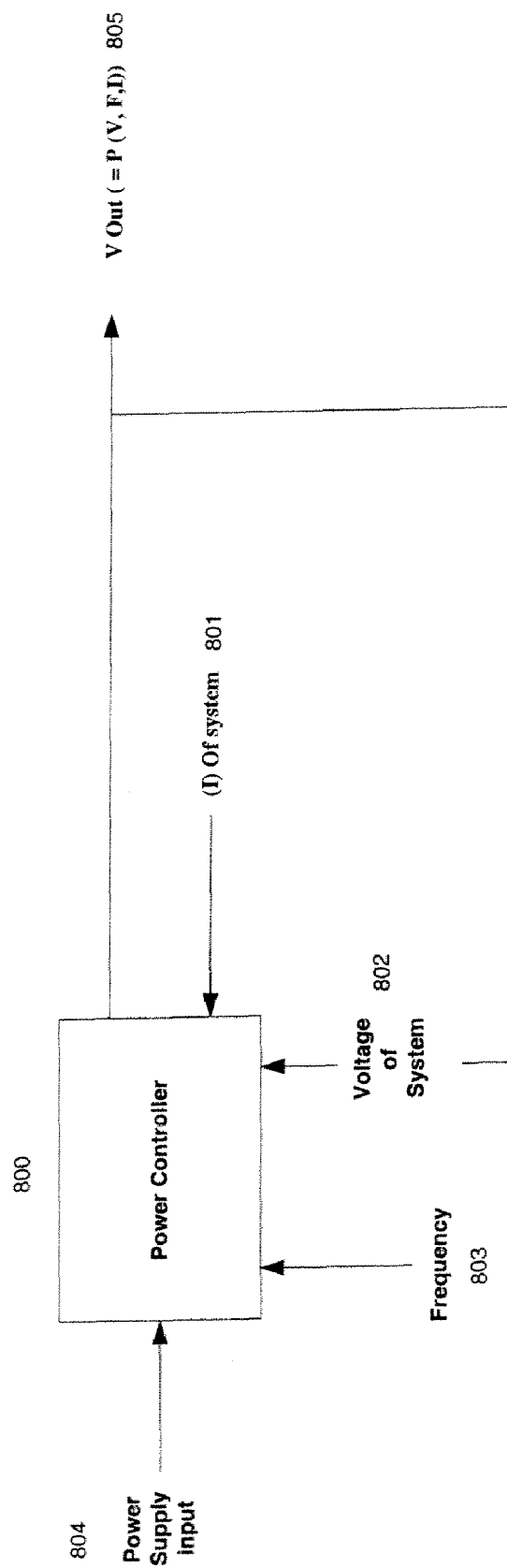
FIG. 8 shows an example of an embodiment according to the present invention, which represents how the present invention is a function of various variables.

FIG. 8 shows an embodiment of the current invention represented by a power controller 800, which functions in response to inputs such as current of the system 801, voltage of the system 802, frequency of the system 803 and power supply input 804. The power controller 800 determines a power level (e.g. of a microprocessor) as a function of the operating frequency of the system 803 (e.g. a data processing system), the voltage of the system 802, and the current of the system 801. The power controller 800, after factoring in the inputs described above, determines the output voltage 805 which is supplied through a power distribution bus (e.g. power distribution planes) in order to maintain a power level (e.g. at the microprocessor) and, in turn, prevent the occurrence of (any) voltage droop or mitigate the effect of a voltage droop.

FIG. 10A shows an exemplary representation of how a system's compute load relates to a system current (I). As compute load increases, for example, a large portion of a microprocessor exits a low power mode and enters a higher power mode, so does the current level, which, in the current invention, is relayed by a current detector to a power or voltage controller of the invention as described above. FIG. 10A may be created by empirically testing a computer system at various levels of compute load (e.g. microprocessor completely asleep (e.g. drawing reduced power) or microprocessor partially asleep (e.g. when a numeric co-processor portion of the microprocessor is asleep but the rest of the microprocessor is active, drawing nearly full power) or microprocessor is completely active) and determining, for each given compute load, the corresponding current drawn by the system or a component of the system such as the system's microprocessor(s). Thus, as shown in FIG. 10A, a system may be run at three different compute loads (CL1, CL2, and CL3, representing increasing levels of computing resources being used in the system) and the corresponding current levels (I1, I2 and I3) may be measured at these different compute loads. This information may then be used to derive a curve such as FIG. 10B or a curve such as FIG. 5 which show the desired output voltage level from a voltage controller of the invention such as voltage controller 400 of FIG. 4. For example, after determining the three current levels, I1, I2, and I3 in FIG. 10A, the required increase in output voltage from a voltage controller of the invention may be determined. Depending on the system, an increase of this output voltage from about 10 to 200 millivolts, for a short duration (e.g. about several microseconds) may be sufficient to reduce the effects of a voltage droop. The change in voltage from the voltage controller will typically be constrained by Vmin and Vmax (for a power supply voltage) which are set by the IC's physical characteristics, but there is typically a range within which a voltage controller of the invention may operate. The desired increases in output voltage from a voltage controller of the invention for corresponding current levels may be determined empirically for a system by varying the output voltage from such a voltage controller and measuring system performance (e.g. MIPS or operating frequency (MHz) or other parameters or various combinations of parameters). FIG. 10B shows an example of the result of such a determination which, as does the curve of FIG. 5, maps given current consumption levels to desired output voltage levels from a voltage controller of the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense and are not to be construed in a manner which limits the following claims.

I claim:

1. An apparatus in a data processing system, said apparatus comprising:
   a voltage controller having an output to prevent power droop caused by a change in computational state, and being coupled to receive a control signal; and
   a detector to detect power change, the detector being coupled to said voltage controller to provide said control signal to indicate a change in power level in said data processing system wherein the voltage controller is configured to deliver an increased voltage for a predetermined amount of time, wherein the predetermined amount of time is determined based on a period of anticipated voltage droop from a change to an increased computational state.

2. An apparatus according to claim 1 wherein said voltage controller is configured to boost voltage by a boost value during the predetermined amount of time and wherein said apparatus compensates for a potential voltage droop and wherein the voltage controller adjusts the output, in response, to the change to the increased computational state, from a first voltage to a second voltage plus the boost value for the predetermined amount of time which is an initial portion of time of operating in the increased computational state and after the initial portion of time, while in the increased computational state, the voltage controller sets the output at the second voltage, and wherein the second voltage exceeds the first voltage.

3. An apparatus according to claim 2 wherein said voltage controller is coupled with a power distribution bus and wherein said detector detects a change in one of current or voltage.

4. An apparatus according to claim 2 wherein the boost value is based on the anticipated voltage droop.

5. An apparatus according to claim 1 wherein said voltage controller provides an adjustable reference voltage based upon the control signal from said detector.

6. An apparatus according to claim 1 wherein said detector is coupled to a microprocessor and said detector detects a change in current drawn by said microprocessor.

7. An apparatus according to claim 1 wherein said detector comprises at least one of a hardware or a software detector.

8. A method for providing a supply of power in a data processing system, said method comprising:
   detecting a change in current, drawn by said data processing system;
   determining according to the change in current a power level; and
   increasing a voltage level for a predetermined amount of time to prevent voltage droop,
      wherein the predetermined amount of time is determined based on a period of
      anticipated voltage droop from a change to an increased computational state.

9. A method as in claim 8 wherein said change in current is detected at a microprocessor to determine whether an increase in demand for power is occurring or is about to occur.

10. A method as in claim 9 wherein said method is used to compensate for a voltage droop in said data processing system.

11. A method as in claim 10 wherein said detecting comprises determining a change in compute load as an indicator of the change in current level.

12. A method as in claim 10 wherein a voltage controller is coupled to receive a current level signal and said voltage controller adjusts said voltage level based on said current level signal.

13. A method as in claim 12 wherein an adjustable reference voltage is provided by the voltage controller and the voltage controller provides the voltage level via a power distribution bus to said microprocessor.

14. A method as in claim 12 wherein said voltage controller, in order to neutralize any voltage droop that can occur at the beginning of the increased computational state, increases the voltage level at the microprocessor by a boost voltage level for the predetermined amount of time up to a predetermined voltage level.

15. A method as in claim 14 wherein said voltage controller after the predetermined amount of time has elapsed decreases the voltage back to within normal parameters during a period of time after the beginning of the increased computational state.

16. A method for providing a supply of power in a data processing system, said method comprising:
   programming a microprocessor in said data processing system with instructions to anticipate changes in compute load levels;
   determining according to said compute load level the power level needed at the microprocessor;
   increasing an output voltage level from a first voltage to a second voltage plus a boost value, in response to an increased compute load level, for an initial portion of time of the increased compute load level to prevent power droop in response to said determining.

17. A method as in claim 16 wherein said programming instructions are used to anticipate changes in compute load, which are coupled with current level changes, and, in turn, determine xvhether an increase in demand for power is occurring or is about to occur.

18. A method as in claim 16 wherein said programming instructions cause a signal to be sent to a voltage controller to indicate the changes in current level at the microprocessor.

19. A method as in claim 18 wherein said voltage controller is coupled to receive said signal and said voltage controller determines the voltage level needed to be supplied a power distribution bus to said microprocessor and wherein the output voltage level is increased to prevent power droop before a change to the increased compute load level.

20. A method as in claim 19 wherein said voltage controller, in order to neutralize any voltage droop that may occur, increases the voltage level for the initial portion of time up to the second voltage plus the boost value.

21. A method as in claim 20 wherein said voltage controller after the initial portion of time has elapsed decreases the output voltage level back to within normal parameters during a remainder of the increased compute load level.

22. An apparatus in a data processing system, said apparatus comprising: a voltage controller having an output to provide power to at least one component in the
   data processing system and being coupled to receive a control signal;
   a detector to detect power change, the detector being coupled to the voltage controller to
   provide the control signal to indicate a change to an increased computational state, wherein the voltage controller is configured to adjust the output, in response to the change to the increased computational state, from a first voltage to a second voltage plus a boost value for an initial portion of time operating in the increased computational state and after the initial portion of time, while in the increased computational state, the voltage controller sets the output to the second voltage and wherein the second voltage exceeds the first voltage.

23. The apparatus as in claim 22 wherein the boost value is based on an anticipated voltage droop during the initial portion of time.

24. The apparatus as in claim 22 wherein the voltage controller adjusts the output to the second voltage plus the boost value before the beginning of the increased computational state.

25. The apparatus as in claim 22 wherein the detector comprises at least one of a hardware and a software detector.

26. A method for providing a supply of power in a data processing system, the method comprising:
   detecting a change in computational load of the data processing system;
   determining a power level according to the change in computational load;
   increasing a power level, in response to an increased computational load, from a first
   power level to a second power level plus a boost value for an initial portion of
   time operating in the increased computational load and after the initial portion of
   time while in the increased computational load setting the power level to the
   second power level which exceeds the first power level.

* * * * *